United States Patent [19]

Asano

[11] Patent Number: 5,274,830
[45] Date of Patent: Dec. 28, 1993

[54] ZERO WARRANTY CIRCUIT FOR DATA PATH HAVING DIFFERENT BIT WIDTH FROM THE LENGTH OF PACKED DECIMAL OPERAND

[75] Inventor: Sadaji Asano, Yamanashi, Japan

[73] Assignee: NEC Corporation, Tokyo, Japan

[21] Appl. No.: 604,270

[22] Filed: Oct. 29, 1990

[30] Foreign Application Priority Data

Oct. 27, 1989 [JP] Japan .................................. 1-281010

[51] Int. Cl.⁵ .............................................. G06F 7/38
[52] U.S. Cl. ..................... 395/775; 395/375; 364/259.7; 364/254.9; 364/DIG. 1; 364/947.4; 364/951.5; 364/951.6; 364/DIG. 2; 364/715.01
[58] Field of Search ............... 395/775, 375, 800; 364/DIG. 1, 715.01, 737, 755, 778, 259.7, 254.9, DIG. 1, 947.4, 951.5, 951.6, DIG. 2

[56] References Cited

U.S. PATENT DOCUMENTS

| | | | |
|---|---|---|---|
| 4,021,655 | 5/1977 | Healey et al. .................. | 395/375 |
| 4,384,340 | 5/1983 | Tague et al. .................. | 364/756 |
| 4,615,016 | 9/1986 | Bradley et al. ................ | 364/756 |

Primary Examiner—Allen R. MacDonald
Assistant Examiner—Glenn A. Auve
Attorney, Agent, or Firm—Sughrue, Mion, Zinn, Macpeak & Seas

[57] ABSTRACT

In a zero warranty circuit which checks the length of a packed decimal operand processed in a circuit having a bit width different from the length of the operand, the latter is translated into a sequence of bits corresponding respectively to different decimal digits of the operand. Each of the bits has a first value indicating validity of the corresponding decimal digit and a second value indicating invalidity of the corresponding decimal digit. Those of the bits which correspond to the decimal digits of odd numbered positions are inverted and applied to first coincidence gates for detecting a coincidence with a respective one of those of the bits which correspond to the decimal digits of even numbered positions. The presence of a nonzero bit in each of the decimal digits of even numbered positions is detected and supplied to second coincidence gates for detecting a coincidence with the output signals from the first coincidence gates to generate a signal indicating an exceptional event.

4 Claims, 2 Drawing Sheets

FIG. 2

| OPERAND LENGTH | DECODER 20 OUTPUTS |
|---|---|
| 0 0 0 0 | 1 1 1 1 1 1 1 1 |
| 0 0 0 1 | 1 1 1 1 1 1 1 0 |
| 0 0 1 0 | 1 1 1 1 1 1 0 0 |
| 0 0 1 1 | 1 1 1 1 1 0 0 0 |
| 0 1 0 0 | 1 1 1 1 0 0 0 0 |
| 0 1 0 1 | 1 1 1 0 0 0 0 0 |
| 0 1 1 0 | 1 1 0 0 0 0 0 0 |
| 0 1 1 1 | 1 0 0 0 0 0 0 0 |
| 1 X X X | 0 0 0 0 0 0 0 0 |

LEGEND

X: BITS TO BE IGNORED

ZERO WARRANTY CIRCUIT FOR DATA PATH HAVING DIFFERENT BIT WIDTH FROM THE LENGTH OF PACKED DECIMAL OPERAND

BACKGROUND OF THE INVENTION

The present invention relates generally to data processors, and more specifically to a zero warranty circuit for checking the length of a packed decimal operand which is to be processed by a data path having a bit width different from the length of the operand.

Variable length decimal operands stored in a memory of a data processor are specified by the start address and the length of an operand which are contained in an instruction word and a specified operand is read out of the memory and checked for the validity of the format prior to arithmetic operations. The results of the operations are stored again into the memory. In a high-speed, byte oriented data processor in which the variable length decimal operand is fetched on a byte length basis (either four bytes or eight bytes) as a unit of data. If the length of the fetched operand is indivisible by the bit width of the data path, there is a likelihood of data being fetched which does not form part of the operand. In order to invalidate such undesired data, a masking circuit is provided by which all bits in the insignificant portion of any fetched data are replaced with all zeros before being applied to a verification circuit. If the operand has an odd number of decimal digits including a sign code in its lowest digit position, it must be warranted that the higher decimal digit (four bits) of the highest byte be all zeros. To this end, the prior art zero warranty circuit includes a detector circuit that detects the position of the highest decimal digit by determining the length of the operand and checks for the presence or absence of zeros in the highest decimal digit position indicated by the detector circuit. However, the prior art detector circuit is complex, increasing the hardware of the data processor.

SUMMARY OF THE INVENTION

It is therefore an object of the present invention to provide a zero warranty circuit which can be implemented by simplified hardware.

According to a broader aspect of the present invention, a highest decimal digit of the operand is detected when the operand has an odd number of decimal digits and a nonzero bit is detected in each of the decimal digits of even numbered positions of the operand. Responsive to the detection of the highest decimal digit and the detection of the nonzero bit a signal is generated indicating an exceptional event.

In a more specific aspect, there is provided a zero warranty circuit for checking the length of a packed decimal operand which is to be processed in a data path having a bit width different from the length of the packet decimal operand. The circuit comprises a decoder for translating the length of the packed decimal operand into a sequence of bits corresponding respectively to different decimal digits of the operand, each of the bits having a first value indicating validity of the corresponding decimal digit and a second value indicating invalidity of the corresponding decimal digit. Noncoincidence gates are provided corresponding respectively to different bytes of the operand, each of the noncoincidence gates having a first input responsive to a respective one of the bits which correspond to decimal digits of odd numbered positions and a second input responsive to a respective one of the bits which correspond to decimal digits of even numbered positions. Nonzero detectors are provided for respectively detecting a nonzero bit in the decimal digits of odd numbered positions. Coincidence gates are associated respectively with the noncoincidence gates and the nonzero detectors. Each of the coincidence gates has a first input responsive to an output signal from the corresponding noncoincidence gate and a second input responsive to an output signal from the corresponding nonzero detector to generate a signal indicating an exceptional event. A masking circuit is responsive to the bits from the decoder for nonmasking those decimal digits of the operand which correspond to the bits of the first value and masking those decimal digits of the operand which correspond to the bits of the second value.

BRIEF DESCRIPTION OF THE DRAWINGS

The present invention will be described in further detail with reference to the accompanying drawings, in which:

FIG. 2 is a decoding table illustrating the relationship between inputs and outputs of the decoder of FIG. 1.

DETAILED DESCRIPTION

Figure 1:
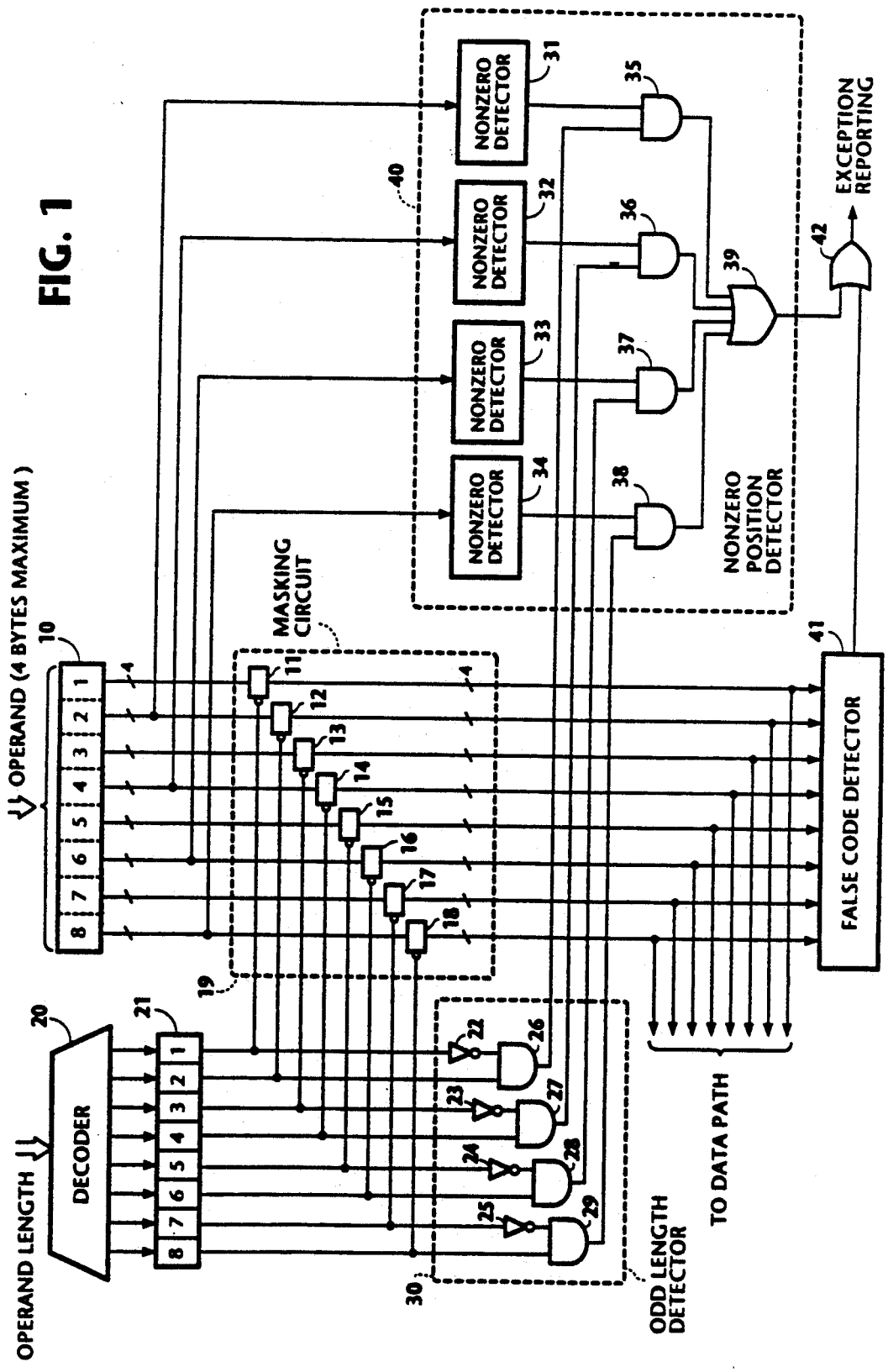
FIG. 1 is a block diagram of a zero warranty circuit according to the present invention for checking the length of packed decimal operands.

Referring now to FIG. 1, there is shown a zero warranty circuit according to the present invention for checking the length of packed decimal operands which are to be processed in a data path having a bit width different from the length of the operand. The zero warranty circuit includes an operand register 10 to which a variable length, packed decimal operand is supplied from a memory, not shown. In the illustrated embodiment, the decimal operand of the packed format is shown as being variable in the range from a one-byte length to a four-byte length. Data of each byte length is divided into higher significant four bits representing a higher-digit decimal number and lower significant four bits representing a lower-digit decimal number. In the case of a four-byte length operand representing eight decimal numbers, the first decimal digit is the lowest digit and stored in the rightmost position of register 10 and the eighth decimal digit is the highest and stored in the leftmost position. Four bits of each decimal digit position of register 10 are connected to each eight masking gates 11-18 of a masking circuit 19 and certain of the input digits is invalidated, or converted to O's in accordance with digit valid/invalid control signals applied to the masking gates.

Meanwhile, four-bit operand length data corresponding to the operand stored in register 10 is supplied to a decoder 20 in which the 4-bit length data is converted to an eight-bit code according to a table shown in FIG. 2, so that the output bits respectively correspond to the decimal digits of the operand stored in register 10 with "1" bits representing invalid digits. The output bits of decoder 20 are stored into a register 21 simultaneously with the storage of corresponding operand data into register 10, and then supplied to masking gates 11-18, respectively, as the digit valid/invalid control signals. The outputs of the masking circuit 19 are supplied to a false code detector 41 and to part of the central processing unit, called a data path (not shown) having a bit width different from the length of the operand.

On the other hand, the first, third, fifth and seventh bit positions of register 21 are connected to inverters 22, 23, 24 and 25, respectively, of an odd length detector 30. The outputs of these inverters are coupled to a first input of AND gates 26, 27, 28 and 29, respectively, which correspond to the respective bytes of the operand, while the second, fourth, sixth and eighth bit positions of register 21 are directly applied to a second input of AND gates 26-29, respectively. Odd length detector 30 is therefore configured to form noncoincidence gates to detect the point which marks the boundary between the insignificant digits and significant digits if the operand digit length is odd. Alternatively, exclusive-OR gates may be provided instead of the inverters and the AND gates to constitute the noncoincidence gates. Since AND gates 26-29 correspond respectively to different bytes of the operand, a "1" output from these AND gates indicates the position of the highest significant byte of an odd digit length operand.

In the masking circuit 19, a "1" bit from register 21 to each masking gate is inverted to a 0 and the four-bit code applied to that gate is nullified to 0's, while a "0" bit from register 21 is inverted to a "1" enabling the gate to allow the input four-bit code to be passed through it.

The four-bit operand data in the second, fourth, sixth and eighth digit positions of register 10 are respectively supplied to nonzero detectors 31, 32, 33 and 34 of a nonzero position detector 40. Each nonzero detector produces a "1" output if the input four-bit digit contains a "1". The outputs of the nonzero detectors are respectively applied to AND gates 35, 36, 37 and 38 to which the outputs of AND gates 26, 27, 28 and 29 are respectively applied. The outputs of AND gates 35-38 are fed to an OR gate 39 whose output is combined with the output of false code detector 41 by an OR gate 42 and supplied to an external circuit, not shown, as the occurrence of an event called "exception reporting".

If the operand has three decimal digits, the corresponding operand length data is "0011", which is converted to an output code "11111000" by decoder 20. Thus, the fourth to eighth decimal digits from register 10 are all replaced with 0's by masking gates 14-18 on the one hand, and a "1" is produced by AND gate 27 on the other, enabling AND 36 to detect a match with the output of nonzero detector 32. If the third decimal digit in register 10 contains a "1", AND gate 36 will produce a "1".

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A checking circuit for a packed decimal operand processed in a data path having a bit width different from a length of said packed decimal operand, said checking circuit comprising:
    decoder means for determining the length of said packed decimal operand;
    digit position detector means, connected to said decoder means, for detecting a decimal digit in a most significant position of said packed decimal operand in response to a determination by said decoder means that said packed decimal operand includes an odd number of decimal digits and for producing a first signal identifying the detected decimal digit;
    zero-bit detector means for detecting a nonzero bit in each of the decimal digits of even numbered positions of said packed decimal operand to produce a second signal identifying a detected nonzero bit; and
    gate means responsive to simultaneous occurrences of the first and second signals for generating a signal indicating that an exceptional event has occurred.

2. A checking circuit for a packed decimal operand processed in a data path having a bit width different from a length of said packed decimal operand, said checking circuit comprising:
    a decoder for translating the length of said packed decimal operand into a sequence of bits corresponding respectively to different decimal digits of said packed decimal operand, each of said bits having a first value indicating validity of a corresponding decimal digit and a second value indicating invalidity of said corresponding decimal digit;
    a plurality of noncoincidence gates corresponding respectively to different bytes of said packed decimal operand, each of said noncoincidence gates having a first input responsive to a respective one of the bits which correspond to decimal digits of odd numbered positions and a second input responsive to a respective one of the bits which correspond to decimal digits of even numbered positions;
    a plurality of nonzero detectors for respectively detecting a nonzero bit in said decimal digits of even numbered positions; and
    a plurality of coincidence gates corresponding respectively to said noncoincidence gates and to said nonzero detectors, each of said coincidence gates having a first input responsive to an output signal from the corresponding nonzero detector and a second input responsive to an output signal from the corresponding noncoincidence gate to generate a signal indicating that an exceptional event has occurred.

3. The checking circuit as claimed in claim 2, further comprising a masking circuit for nonmasking those decimal digits of the packed decimal operand which correspond to bits having said first value and masking those decimal digits of the packed decimal operand which correspond to bits having said second value.

4. A method for checking a length of a packed decimal operand processed in a data processor having a bit width different from the length of said packed decimal operand, comprising the steps of:
    a) translating the length of said packed decimal operand into a sequence of bits corresponding respectively to different decimal digits of said packed decimal operand, each of said bits having a first value indicating validity of a corresponding decimal digit and a second value indicating invalidity of said corresponding decimal digit;
    b) detecting a noncoincidence between adjacent ones of said bits;
    c) respectively detecting a nonzero bit in said decimal digits of even numbered positions; and
    d) detecting a coincidence between said noncoincidence detected in step b) and said nonzero bit detected in step c) for generating a signal indicating that an exceptional event has occurred.

* * * * *

UNITED STATES PATENT AND TRADEMARK OFFICE
CERTIFICATE OF CORRECTION

PATENT NO.   : 5,274,830
DATED        : December 28, 1993
INVENTOR(S)  : Sadaji ASANO It is certified that error(s) appears in the above-identified patent and that said Letters Patent is hereby corrected as shown below:

Col. 2, line 49, delete "-" and insert -- ~ --;

Col. 2, line 63, delete "-" and insert -- ~ --.

Col. 3, line 9, delete "-" and insert -- ~ --;

Col. 3, line 16, delete "-" and insert -- ~ --;

Col. 3, line 34, delete "-" and insert -- ~ --;

Col. 3, line 43, delete "-" and insert -- ~ --;

Signed and Sealed this

Twenty-fourth Day of January, 1995

Attest:

BRUCE LEHMAN

*Attesting Officer*    *Commissioner of Patents and Trademarks*